United States Patent [19]
Hall

[11] Patent Number: 5,368,074
[45] Date of Patent: Nov. 29, 1994

[54] WELL CASING THREAD PROTECTOR

[75] Inventor: Terry Hall, Metairie, La.

[73] Assignee: Connection Technology, Ltd., New Orleans, Calif.

[21] Appl. No.: 877,404

[22] Filed: May 1, 1992

Related U.S. Application Data

[63] Continuation-in-part of Ser. No. 827,402, Jan. 29, 1992, Pat. No. 5,148,835, which is a continuation of Ser. No. 572,266, Aug. 27, 1990, abandoned.

[51] Int. Cl.$^5$ .............................................. B65D 59/00
[52] U.S. Cl. ................................... 138/96 T; 138/96 R
[58] Field of Search ..................... 138/96 R, 96 T, 89, 138/99, 110, 178; 215/329, 275, 43 A; 166/243

[56] References Cited

U.S. PATENT DOCUMENTS

| | | | |
|---|---|---|---|
| 3,038,502 | 6/1962 | Hauk et al. | 138/96 T |
| 3,713,463 | 1/1973 | Bywater, Jr. | 138/96 T |
| 4,202,376 | 5/1980 | Forsell | 138/96 R |
| 4,349,048 | 9/1982 | Clark | 138/96 R |
| 4,809,752 | 3/1989 | Strödter | 138/96 T |

FOREIGN PATENT DOCUMENTS

| | | | |
|---|---|---|---|
| 0672432 | 10/1963 | Canada | 138/96 T |
| 0521303 | 5/1940 | United Kingdom | 138/96 R |

Primary Examiner—Stephen F. Gerrity
Assistant Examiner—Reginald L. Alexander
Attorney, Agent, or Firm—Pravel, Hewitt, Kimball & Krieger

[57] ABSTRACT

A casing pipe thread protector which includes a body member molded of flexible material, such as urethane, with memory/resiliency characteristics, having a central opening through which a pin end of a length of casing will fit, the body member in a molded slightly open position, to accommodate the casing, a strap set within a channel formed around the annular wall of the body member, the strap having a locking member at its first opposing end, and an adjustment screw, so that the strap can be adjusted to various locking tightness. Upon sliding the pin end of the casing in the central opening, the locking member is moved to the closed position, tightening the body member around the pin, so that the threads are completely encircled around the pin end. Further, there is provided a recess wherein the locking member is resting, to provide alignment of the body member around the pipe member, and to prevent movement of the strap relative to the body member when the locking means is moved between locked and unlocked positions.

14 Claims, 4 Drawing Sheets

WELL CASING THREAD PROTECTOR

This application is a continuation-in-part of patent application U.S. Ser. No. 827,402, filed Jan. 29, 1992, now U.S. Pat. No. 5,148,835, which was a continuation of application U.S. Ser. No. 572,266, filed on Aug. 27, 1990, now abandoned, by the same invention entity.

BACKGROUND OF THE INVENTION

1. Field Of The Invention

The apparatus of the present invention relates to oil well tubing, for example, drilling pipe or production casing. More particularly, the present invention relates to an apparatus for engaging the external threads of well casing so as to protect the threads from contact with obstacles while the pipe is being handled.

2. General Background

Protection of the threads of oil well tubing, more particularly, drill pipe or production casing, is a serious and recurring problem in the industry. For purposes of this application, reference to "casing" will encompass any length of tubing used in the drilling or production of oil or gas wells. Casing must be connectedly engaged end to end by threaded connections which must be very secure and be able to protect against leakage of oil or gas under extremely high pressures. Therefore, casing threads are machined to very precise tolerances. However, because the 30 to 60 foot lengths of casing must be handled by machine and moved from racks to be connected to other lengths of casing, it is very difficult to avoid the threaded pin end of the pipe from striking against foreign objects, and the damage to the threads occurring. Of course the slightest deformation of the threads could result in thread malfunctioning.

There have been several patents issued in the art on thread protectors, which patents are addressed in the accompanying prior art statement provided herewith. In addition, one of the co-inventors of the present application has file applications on earlier embodiments, which bear Ser. Nos. 572,266, filed on Aug. 27, 1990, now abandoned, and U.S. application Ser. No. 827,402, filed Jan. 29, 1992, presently pending, both applications incorporated by reference herein. In this application, a co-inventor, Terry Hill, has developed improvements to the current pending application, which improvements greatly simplify and improve the operation of the earlier embodiments.

SUMMARY OF THE PRESENT INVENTION

The present invention solves the problems in the art, and provides improvements over earlier embodiments of the invention, in a simple and straightforward manner. What is provided is a casing thread protector which includes a body member molded of flexible material with resilient and memory characteristics, such as urethane or some other similar material, having a central opening into which a pin end of a length of casing will fit, the body member molded in a slightly open position by having a continuous slot formed in its side wall, to accommodate the casing. A strap is set within a channel formed around the annular wall of the body member, the strap having a locking member at its first opposing end, and an adjustment screw, so that the strap can be adjusted to various locking tightness. Upon sliding the pin end of the casing in the central opening, the locking member is moved to the closed position, tightening the body member around the pin end, so that the threads are completely encircled by the body member. Further, there is provided a recess wherein the locking member is resting, to provide alignment of the body member around the pipe member.

Therefore, it is principal object of the present invention to provide a flexible, resilient protector constructed preferably of urethane, for pipe threads which can easily be secured around and removed from the end of the pipe;

It is a further principal object of the present invention to provide a pipe thread protector which would have a high degree of memory/resiliency, formed to be open sufficiently to easily place around the pin end of a casing member, and locked in place with a removable strap and locking member, so that upon unlocking the protector, the protector returns to its normal open position;

It is a further object of the present invention to provide an improved thread protector which provides a molded body member and a removable locking member, so that the locking member can easily be interchanged if damaged;

It is a further object of the present invention to provide a thread protector that can be molded in various sizes, and which provides a locking member which can be easily engaged and disengaged to secure the protector around the length of casing; and It is a further object of the present invention to provide an improved casing thread protector which, whether in the locked or unlocked position, provides protection of the locking mechanism within the recessed channel formed in the body member.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 2:
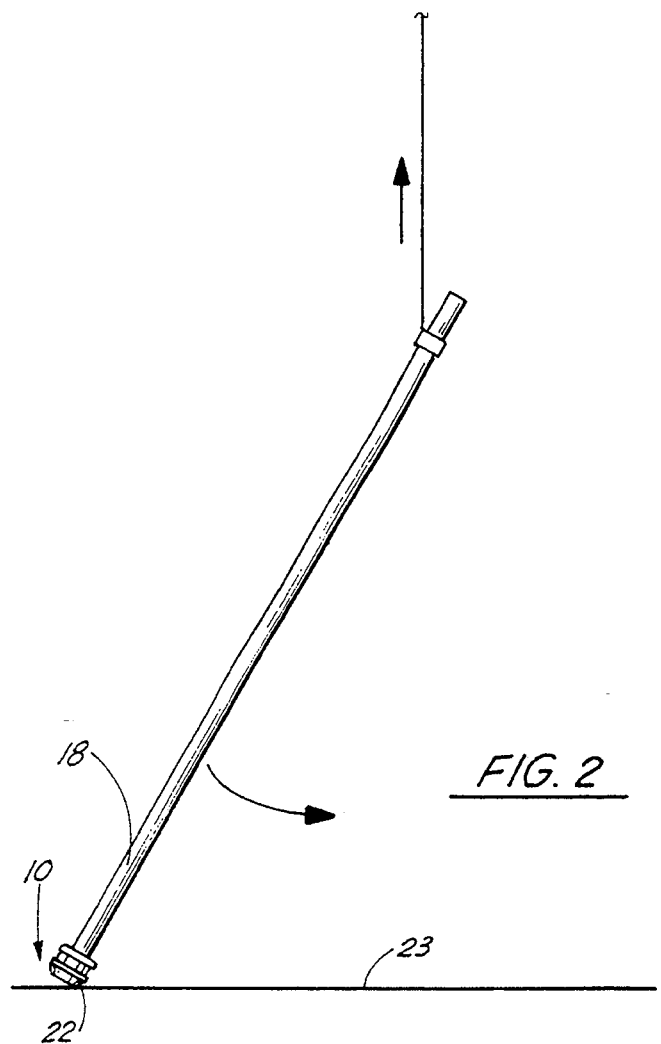
FIG. 2 illustrates a view of the apparatus secured to a length of drill pipe or casing.

FIGS. 1 through 9 illustrate the preferred embodiment of the present invention by the numeral 10. As illustrated more particularly in FIGS. 1 apparatus, or pipe thread protector 10 comprises generally a molded body portion 12, which would be molded in one piece from a hard, resilient neoprene rubber or the like material, so that the member will take contact with foreign objects, and protect the casing end when in place. The body member 12 is formed as a circular member, having a central opening 14 therethrough, through which the casing end 15 would be slidably positioned. On the interior of the central opening 14 there is formed a circular shoulder 16 (See FIG. 9) defining a stop member which the end 17 of the casing 18 would abut up against when positioned properly within opening 14. In order to enlarge the opening 14 while casing 18 is being engaged therein, there is a slot 20 formed through the body member to provide a means to allow that the opening 14 in body member 12 be slightly larger than the diameter of a casing member 18 for facilitating engagement of member 12 therein. Other features of the body member 12 itself includes a beveled edge 22, which is positioned so that, as seen in FIG. 2, when a length of casing is moved via dragging along the ground, and body member is locked around the end 17 of casing 18, that the beveled edge 22 provides the primary surface contact with the ground 23. Further, body member 12 includes a continuous channel 25 in its outer wall 27 through which the means to lock member 12 around the end 17 of casing 18, the structure and function of which will be discussed next.

Turning now to a discussion of the locking means 30 of body member 12, reference is made to FIGS. 1 through 7. The improved locking means 30 includes a simplified embodiment over the embodiment disclosed in the earlier applications. In this improved embodiment, locking means 30 comprises a flexible, fabric belt member 32, constructed of a high tensile-strength fabric, the width of belt 32 being slightly narrower than channel 15, so that strap 32 fits well into channel 25 as illustrated. Structurally, strap 32 is two strap members 34, 36, joined at a first end via an adjustment screw means 38. As seen in FIG. 8), this means comprises a first and second attachment brackets 39, 41 to each of which the ends of strap members 34, 36 attach. Each bracket 39, 41 are secured together via adjustment screw 43, as illustrated, so tightening or loosening screw 43 would slightly adjust the length of strap 32, the reason to be discussed further. The second adjoining ends 40,42 of straps 34,36 define the means by which strap 32 is positioned between engaged and disengaged around body member 12.

Figure 1:
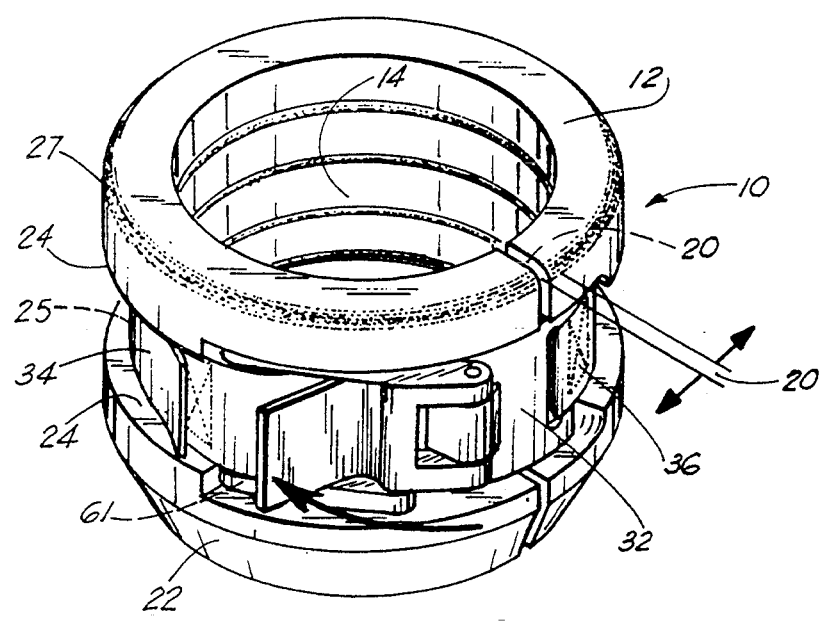
FIG. 1 illustrates an overall perspective view of the preferred embodiment of the apparatus of the present invention.
Figure 9:
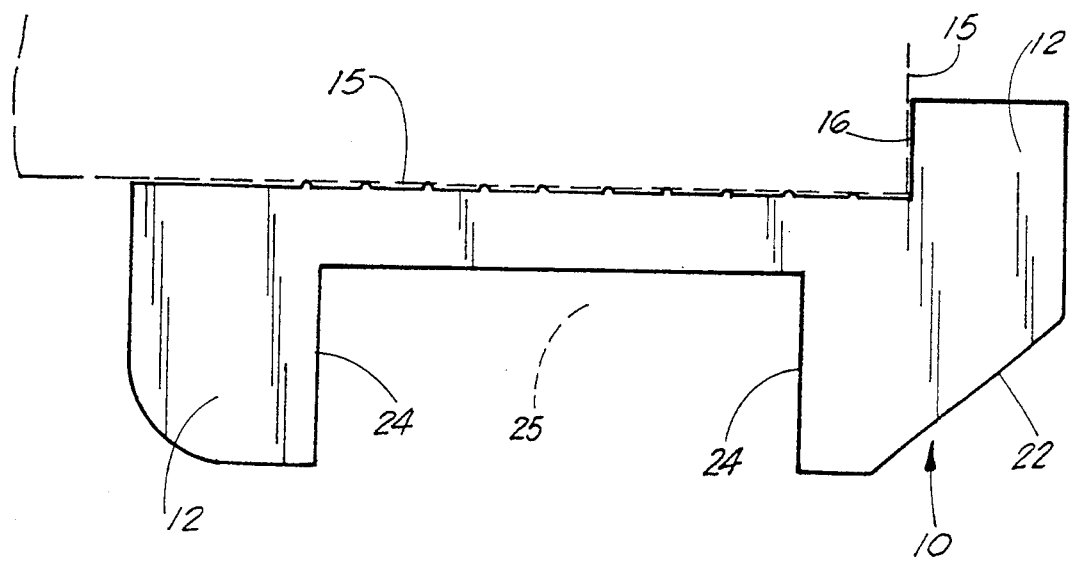
FIG. 9 illustrates is cross-section a length of pipe secured within the apparatus.
Figure 3:
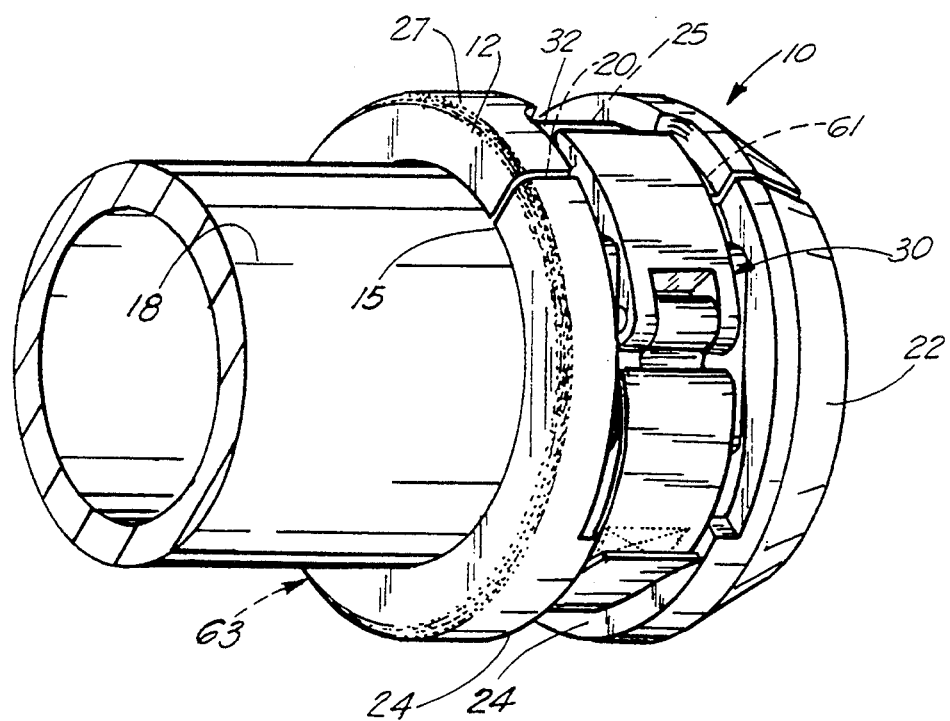
FIG. 3 illustrates an overall perspective view of the preferred embodiment of the apparatus secured to the end of a length of pipe or casing.
Figure 5:
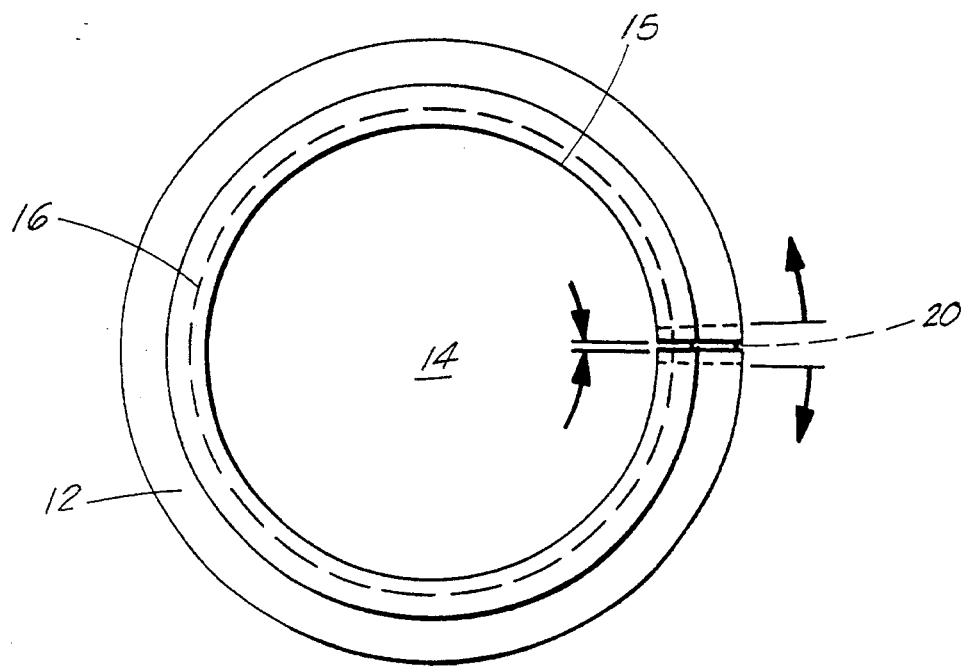
FIGS. 4 and 5 illustrate side representational views of the apparatus apart from and surrounding a length of pipe, respectively.
Figure 4:
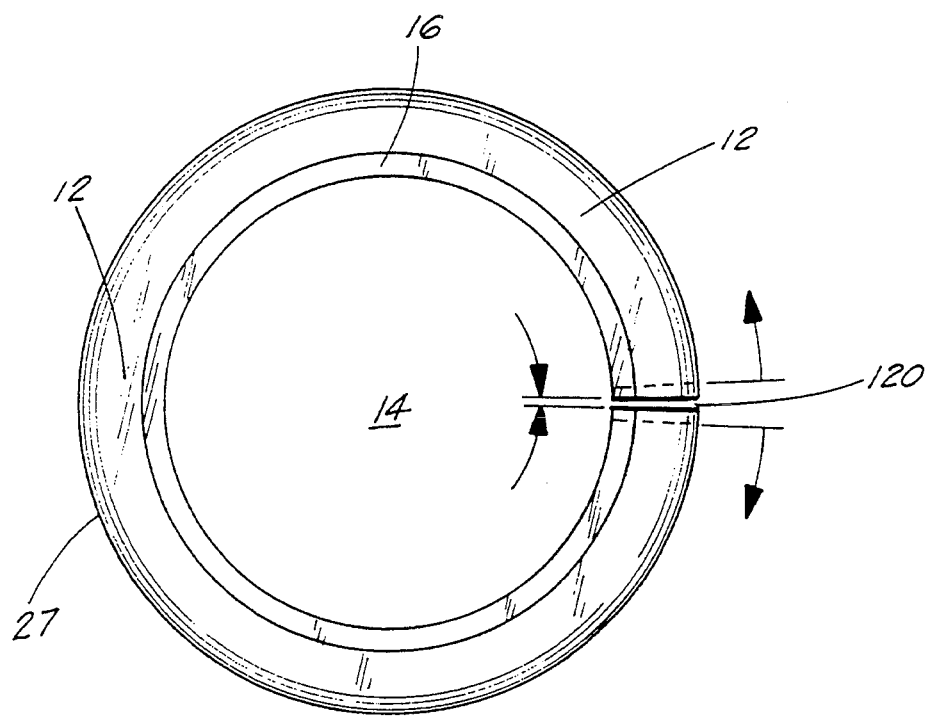
Figure 6:
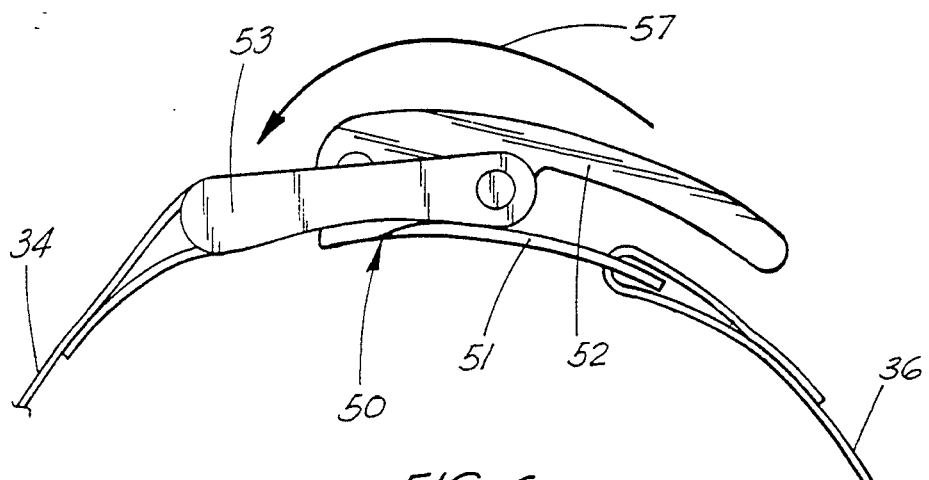
FIGS. 6 and 7 illustrate the locking mechanism of the apparatus in the open and closed positions respectively.
Figure 7:
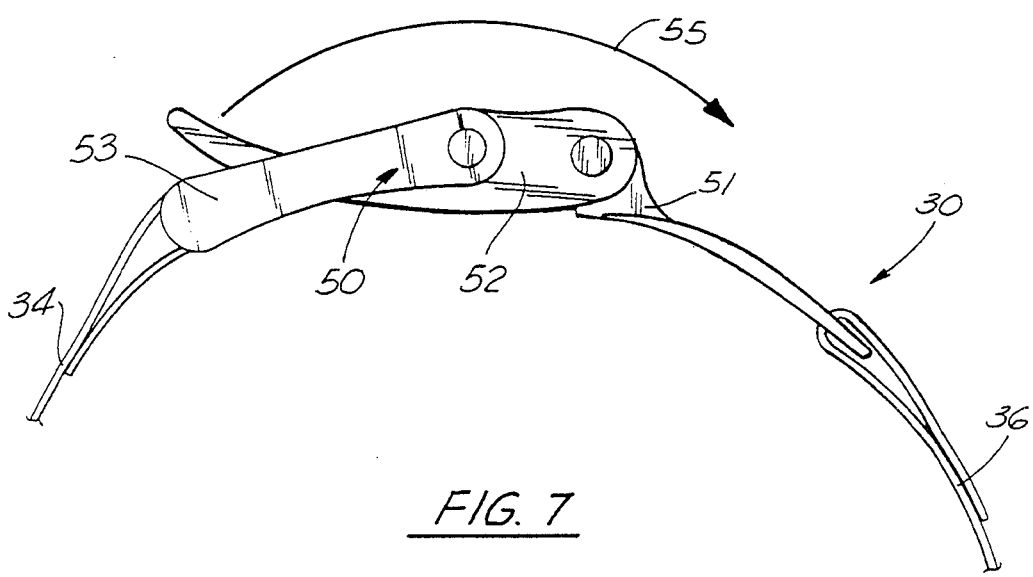
Figure 8:
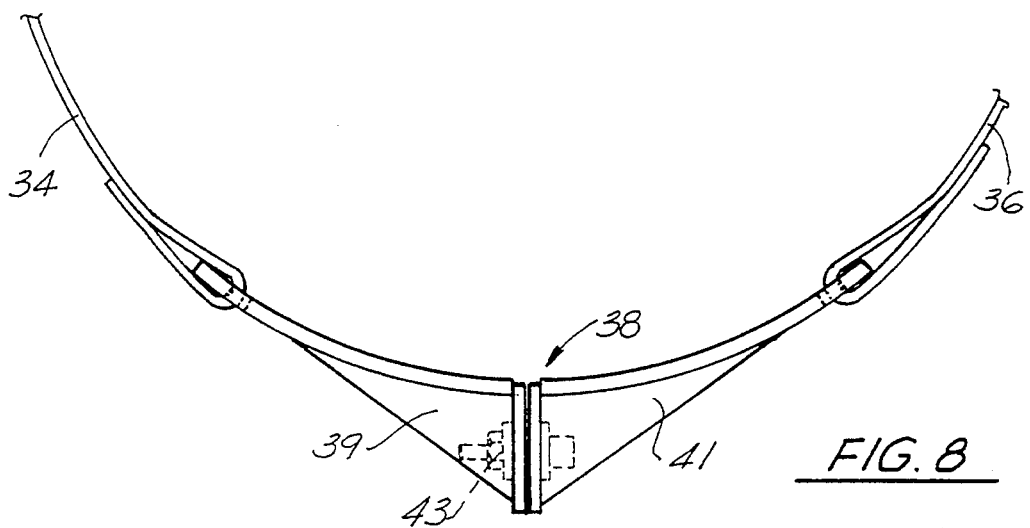
FIG. 8 illustrates the adjustment mechanism of the apparatus of the present invention.

Turning now to FIGS. 6 and 7, this means comprises a locking mechanism 50, of the type generally known for locking opposing ends of straps on boots or the like. The mechanism 50 would provide a first bracket 51 to which strap 36 is attached, and a second bracket 53, to which strap 34 is attached. There would be a handle member 52 connecting the two brackets 51, 53, so that rotation of handle member in the direction of arrow 55, as seen in FIG. 7, move the ends of straps 34, 36 into locked positions around body 12, and when rotated in the direction of arrow 57, in FIG. 6, loosens the straps 34, 36 into the unlock position. When the handle 52 is locked as seen in FIGS. 3 and 6, the tension of the straps tightening around body member 12 closes slot 20 formed in the body 12 from its normally open position as seen in FIGS. 1 and 4, to the closed position around casing end 15 as seen in FIGS. 3 and 5, and the end of the casing 18 is secured within circular opening 14. When closed, the handle member 52 is secured in the down position as seen in FIG. 3, so that the handle member 52 is fully positioned within channel 25 and below the side walls 24 of channel 25. Therefore, should the apparatus strike the ground, no part of the locking mechanism 50, including handle 52, would make contact with a foreign object, which may cause inadvertent opening of the body member 12. Likewise, when the handle member is moved to the open position, as seen in FIGS. 1 and 4, the body member 12 returns to its naturally slightly open position as seen in FIG. 4, so that the slot 20 is reopened. This causes the straps 34, 36 to tighten around the body member 12, and in doing so, place sufficient tension on handle 52 to lay it down in the open position in channel 25, as seen in FIG. 1. In the closed position, the locking mechanism is positioned within channel 25 and would not make contact with foreign objects if inadvertently dropped.

As illustrated, channel 25 further provides a recessed area 61, which is of a formation to accommodate the metal brackets 51, 53, to which handle member 52 is attached, as illustrated in FIG. 1. This recessed area 61 allows that the locking mechanism 50, and likewise straps 34, 36, be positioned directly in alignment within channel 25, and therefore, the abutting edges of slot 20 meet squarely when the buckle member 52 closes strap 34, 36 around body member 12. Likewise the channel 25 is provided with a second recessed area 63 where the attachment brackets 39, 41 are positioned, the width of the recessed area 63, as with recessed area 61, being machined so that the brackets 39, 41 are positioned precisely with area 63, and brackets 51, 53 are positioned precisely within recessed area 61. Therefore, when the straps are being locked into place the position of the locking brackets and adjustment brackets within slots 61, 63 are such as that the locking means does not rotate freely around the wall of the member 12, and the straps are stationary despite the force of the locking mechanism which would tend to move the straps within the channel 25.

In summary, FIGS. 4 and 5 illustrate representation views of the apparatus accommodating a length of casing 18. As illustrated in FIG. 4, the apparatus includes slot 20 along its width, so that it is molded normally in the slightly open position to easily accommodate the end of the casing, as seen set in place against shoulder 16 in FIG. 9. When the end 15 is engaged within opening 14 of apparatus 10, the locking mechanism 50 is locked into the position as seen in FIG. 3, and the slot 20, which was slightly open, is pulled closed and the body of apparatus 10 engages securely around the threaded end 15 of casing 18. When the apparatus is unlocked as seen in FIG. 8, body 12 returns to its natural open position as seen in FIG. 1, and the casing can easily be retrieved therefrom. As was stated earlier, because the body member is normally open, the locking straps 34, 36 around its exterior are always pulled taut around the body, and therefore, even in the open position, locking mechanism 50 is engaged in such a manner that no part of the locking mechanism extends beyond the height of the walls 24 of channel 25 formed in the wall of body 12 where locking straps 34, 36 are set in place.

The use of the simplified and improved strap and buckle arrangement as described provides a simplified closure and opening mechanism for the apparatus over both the prior art and the earlier embodiments as described in the pending application. There is no longer a needed to fold the strap upon itself, weave it thorough the closure buckle. A simple forward and backward motion of the handle locks and unlocks the body member around the casing. That is, when the handle means is in the locked position, a flip of the handle will have it move past the centerline of travel. The memory feature of the urethane will cause the body to return to the open position, and, in effect, the handle will travel to the unlocked position, without further urging. This will provide that the handle is housed within channel 25 at all times during use of the apparatus. Furthermore, the closure strap is totally disconnected from the body member at all times. If the strap, for some reason, malfunctions, it may easily removed, and another strap set in place.

GLOSSARY OF TERMS pipe thread protector 10
body portion 12
central opening 14
pipe end 15
circular shoulder 16
casing 18
slot 20
beveled edge 22
ground 23
sidewalls 24
channel 25
outer wall 27
locking means 30
belt member 32
strap members 34, 36
screw means 38
adjustment brackets 39, 41
screw 43
locking mechanism 50
handle member 52
first bracket 51
second bracket 53
arrow 55
arrow 57
recessed area 61
recessed area 63

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for protecting the threads of a section of oil well pipe, comprising:
    a) a body member constructed of resilient material having an inner face and an outer face, an outer wall, and a central opening through the body member;
    b) a slot formed in the wall of the body member extending from the inner to the outer face and in communication with the central opening, for allowing the body member to be moved to an open position to accommodate the section of pipe to be protected when the section of pipe is positioned in the central opening;
    c) a flexible strap member, positioned around the outer wall of the body member to engage and to secure the body member around the section of pipe when the flexible member is engaged in place around the body member;
    d) locking means related to the strap member to maintain the body member engaged around the section of pipe when the locking means is in the locked position and to allow the body member to return to the normally open position when the locking means is returned to the unlocked position; and
    e) a recessed channel around the wall of the body member so that the flexible strap member is positioned in the channel.

2. The apparatus in claim 1, wherein the locking means is protected by channel walls.

3. The apparatus in claim 2, further comprising a first recessed portion of the channel for housing a buckle member on the locking means to align the body member properly around the end of the tubular member when the buckle member is moved to the closed position, and to prevent rotation of the flexible strap member around the body member when the locking means is moved to the locked or unlocked positions.

4. The apparatus in claim 1, wherein, the flexible strap member is removable from around the body member and replaceable.

5. The apparatus of claim 1, wherein the body member comprises urethane.

6. The apparatus of claim 3, wherein the buckle of the locking means is secured within the channel both when the buckle member is in the open or closed position.

7. The apparatus of claim 1, further comprising an adjustment means on the flexible strap member for adjusting the length of the flexible strap member around the body member, the adjustment means also positioned within a second recess in the channel.

8. An apparatus for protecting the threads of a section of oil well pipe, comprising:
    a) a body member constructed of urethane having resiliency/memory characteristics, the body member having a wall portion extending between inner and outer faces of the body portion, and an opening therethrough, for engaging around a section of pipe to be protected;
    b) a flexible strap member, positioned within a channel formed around the body member to secure the body member around an end of the pipe when the strap is moved from an open position to a locked position;
    c) a slot formed in the wall of the body member extending between the inner and outer faces an in communication with the central opening, defining a means to allow the central opening to be greater than the diameter of the pipe when the pipe is positioned in the central open, and to provide a means to reduce the size of the central opening when the strap member is locked in place around the body member;
    d) a locking means on the strap member to reduce the length of the strap when the locking means is in the locked position to sufficiently engage the body member around the pipe end;
    e) the memory/resiliency characteristics of the body member being such that when the locking means is unlocked, the body member returns to a normally open position, moving a lock handle on the locking means to the fully open position, so that it is within the channel formed around the body member; and
    f) a recessed channel around the wall of the body member so that the flexible strap member is positioned in the channel.

9. The apparatus in claim 8, wherein the strap member is removable from around the body member and replaceable.

10. The apparatus in claim 8, wherein the body member comprises neoprene rubber.

11. The apparatus in claim 8, wherein a buckle member of the locking means is secured within the channel both when the buckle member is in the open or closed position.

12. An apparatus for protecting the threads of a section of oil well casing, comprising:
   a) a body member constructed of hard, resilient urethane, having an annular wall portion, extending between an inner face and an outer face of the body member, and a central opening therethrough, said body portion for engaging around a section of casing to be protected;
   b) a flexible strap member, removably positioned around the wall of the body member to secure the body member around an end of the casing when the strap is moved from an open position to a locked position;
   c) a slot cut through the wall of the body member extending from the inner to the outer face of the body member and in communication with the central opening, defining a means to allow the central opening to be greater than the diameter of the casing when the casing is positioned in the central open, and to provide a means to compress the wall of the central opening around the casing end when the strap member is locked in place around the body member;
   d) locking means on the strap member to reduce the length of the strap when the locking means is in the locked position to sufficiently engage the body member around the pipe end;
   e) a recessed channel around the wall of the body member so that the flexible strap member is positioned in the channel;
   f) the body member possessing memory/resiliency characteristics such that when the locking means is unlocked, the body member returns to its normally open position, moving the lock handle to the fully open position, so that it is within the channel formed around the body member.

13. The apparatus in claim 12, wherein there is further provided a bevelled edge on the annular wall portion of the body member to make contact with a surface when the casing with the body member secured therearound is being dragged along the surface.

14. An apparatus for protecting the threaded end of a section of oil well pipe, comprising:
   a) a molded body member of resilient material, having an outer wall, an inner face and an outer face, and a central opening through the molded body member, the diameter of the central opening greater than the diameter of the threaded end of the section of pipe to be protected;
   b) a flexible member removably mounted around the outer wall of the molded body member to reduce the diameter of the central opening to engage the molded body member around the threaded end of the section of pipe when the flexible member is constricted around the molded body member;
   c) means mounted on the flexible member to maintain the molded body member engaged around the threaded end of the section of pipe and to allow the molded body member to return to a normally open position when the flexible member is disengaged from the molded body member; and
   d) a recessed channel around the wall of the body member so that the flexible strap member is positioned in the channel.

* * * * *

UNITED STATES PATENT AND TRADEMARK OFFICE
CERTIFICATE OF CORRECTION

PATENT NO. : 5,368,074
DATED : Nov. 29, 1994
INVENTOR(S) : Terry Hall

It is certified that error appears in the above-identified patent and that said Letters Patent is hereby corrected as shown below:

On the title page:
Change item [73], Assignee, to read as follows:

--[73] Assignee:  Connection Technology, Ltd., New Orleans, La.--

Signed and Sealed this

Seventh Day of March, 1995

Attest:

BRUCE LEHMAN

Attesting Officer  Commissioner of Patents and Trademarks